(12) United States Patent
DaCosta

(10) Patent No.: US 9,654,737 B2
(45) Date of Patent: May 16, 2017

(54) METHODS, SYSTEMS AND APPARATUSES TO ENHANCE BROADCAST ENTERTAINMENT

(75) Inventor: Behram DaCosta, San Diego, CA (US)

(73) Assignee: Sony Corporation, Tokyo (JP)

( * ) Notice: Subject to any disclaimer, the term of this patent is extended or adjusted under 35 U.S.C. 154(b) by 1387 days.

(21) Appl. No.: 11/692,063

(22) Filed: Mar. 27, 2007

(65) Prior Publication Data
US 2008/0244676 A1    Oct. 2, 2008

(51) Int. Cl.
| H04N 7/173 | (2011.01) |
| H04N 21/4722 | (2011.01) |
| H04N 21/658 | (2011.01) |
| H04N 21/8352 | (2011.01) |
| H04N 21/858 | (2011.01) |

(52) U.S. Cl.
CPC ..... *H04N 7/17318* (2013.01); *H04N 21/4722* (2013.01); *H04N 21/6581* (2013.01); *H04N 21/8352* (2013.01); *H04N 21/858* (2013.01)

(58) Field of Classification Search
CPC ........... H04N 21/4722; H04N 21/6581; H04N 21/8352; H04N 21/858
USPC ........... 725/32–36, 51, 60–61, 109, 112, 136
See application file for complete search history.

(56) References Cited

U.S. PATENT DOCUMENTS

| 5,530,469 A | 6/1996 | Garfinkle |
| 5,898,919 A * | 4/1999 | Yuen .............................. 455/420 |
| 6,061,719 A | 5/2000 | Bendinelli et al. |
| 6,326,982 B1 * | 12/2001 | Wu et al. ...................... 715/718 |
| 6,446,130 B1 | 9/2002 | Grapes |
| 7,032,235 B2 * | 4/2006 | Pelkey et al. ................... 725/36 |
| 7,099,798 B2 | 8/2006 | Yu et al. |
| 7,146,632 B2 * | 12/2006 | Miller ........................... 725/114 |
| 7,194,758 B1 * | 3/2007 | Waki et al. ................... 725/141 |
| 7,392,393 B2 | 6/2008 | Taki |
| 7,634,734 B2 | 12/2009 | Fuller et al. |
| 7,792,756 B2 | 9/2010 | Plastina et al. |

(Continued)

FOREIGN PATENT DOCUMENTS

| EP | 1 524 582 A2 | 4/2005 |
| JP | 10-042050 | 2/1998 |

(Continued)

OTHER PUBLICATIONS

Machine translation of JP 2005260322 A.*

(Continued)

*Primary Examiner* — Yassin Alata
(74) *Attorney, Agent, or Firm* — Fitch, Even, Tabin & Flannery LLP

(57) ABSTRACT

The present embodiments provide methods and systems to access additional, enhanced and/or interactive content associated with a broadcast program received over a closed broadcast network. Some embodiments provide methods of enhancing broadcast content by receiving broadcast content from a broadcast content source over a closed network, receiving a request to tune in a broadcast program, tuning in the broadcast program from the broadcast content, extracting a program identification of the broadcast program from the broadcast content, and communicating the program identification to a remote network access device to allow access over a network to additional content associated with the broadcast program.

19 Claims, 8 Drawing Sheets

(56) References Cited

U.S. PATENT DOCUMENTS

| | | |
|---|---|---|
| 7,796,190 B2 | 9/2010 | Basso et al. |
| 7,805,373 B1 | 9/2010 | Issa et al. |
| 8,060,631 B2 | 11/2011 | Collart et al. |
| 2002/0068558 A1 | 6/2002 | Janik |
| 2002/0162121 A1 | 10/2002 | Mitchell |
| 2003/0005135 A1 | 1/2003 | Inoue et al. |
| 2003/0174818 A1 | 9/2003 | Hazenfield |
| 2004/0031063 A1* | 2/2004 | Satoda ............... 725/143 |
| 2004/0044532 A1 | 3/2004 | Karstens |
| 2004/0103032 A1 | 5/2004 | Maggio |
| 2004/0261126 A1* | 12/2004 | Addington et al. ........ 725/135 |
| 2005/0015796 A1 | 1/2005 | Bruckner et al. |
| 2005/0108026 A1 | 5/2005 | Brierre et al. |
| 2005/0210101 A1 | 9/2005 | Janik |
| 2005/0246747 A1* | 11/2005 | Braun et al. ................ 725/81 |
| 2005/0262542 A1* | 11/2005 | DeWeese et al. ........... 725/106 |
| 2005/0278771 A1 | 12/2005 | Hassell et al. |
| 2005/0289139 A1 | 12/2005 | Takashima et al. |
| 2006/0089820 A1 | 4/2006 | Yu et al. |
| 2006/0095472 A1* | 5/2006 | Krikorian et al. ........ 707/104.1 |
| 2006/0123246 A1 | 6/2006 | Vantalon et al. |
| 2006/0174308 A1 | 8/2006 | Fuller et al. |
| 2006/0190559 A1 | 8/2006 | Lim |
| 2006/0195887 A1 | 8/2006 | Shusman |
| 2006/0206563 A1 | 9/2006 | Van De Sluis |
| 2006/0235801 A1 | 10/2006 | Strom et al. |
| 2007/0077784 A1 | 4/2007 | Kalayjian et al. |
| 2007/0180485 A1 | 8/2007 | Dua |
| 2007/0245366 A1 | 10/2007 | Mitsui |
| 2008/0109556 A1 | 5/2008 | Karlberg |
| 2008/0244676 A1 | 10/2008 | DaCosta |
| 2009/0059512 A1 | 3/2009 | Lydon et al. |
| 2009/0150553 A1 | 6/2009 | Collart et al. |
| 2009/0228919 A1 | 9/2009 | Zott et al. |
| 2010/0293598 A1 | 11/2010 | Collart et al. |
| 2012/0030366 A1 | 2/2012 | Collart et al. |

FOREIGN PATENT DOCUMENTS

| | | | |
|---|---|---|---|
| JP | 2004-013611 | | 1/2004 |
| JP | 2005260322 A | * | 9/2005 |
| JP | 2007-266881 | | 10/2007 |
| WO | 03/087961 A1 | | 10/2003 |
| WO | WO-2005057346 | | 6/2005 |
| WO | 2006/103577 A1 | | 10/2006 |
| WO | WO-2009076474 | | 6/2009 |

OTHER PUBLICATIONS

Official translation of JP 2005260322 A.*
Examiner Interview Summary for 12332238 mailed May 18, 2011.
Examiner Interview Summary for 12332238 mailed Jun. 29, 2011.
Final Office Action from 12332238 mailed Mar. 18, 2011.
International Search Report and Written Opinion of the International Searching Authority for PCTUS2008086287 mailed Jun. 24, 2009.
Non Final Office Action from 12332238 mailed Sep. 29, 2010.
Notice of Allowance for 12332238 mailed Jun. 29, 2011.
Collart; U.S. Appl. No. 12/332,238, filed Dec. 10, 2008.
Collart; U.S. Appl. No. 12/842,001, filed Jul. 22, 2010.

* cited by examiner

METHODS, SYSTEMS AND APPARATUSES TO ENHANCE BROADCAST ENTERTAINMENT

FIELD OF THE INVENTION

The present invention relates generally to broadcasted content, and more particularly to enhancing the experience associated with broadcasted content.

BACKGROUND

Broadcast content has become an integral part of many peoples' lives. The number of broadcasters and the broadcast content has dramatically increased over the past couple of decades. Hours are spent each day by vast numbers of people in viewing and/or listening to broadcast content.

Similarly, the use of the Internet is increasing, and people are using the Internet to access and acquire information about all sorts of topics. Many people are using the Internet to get much of their information about topics and events taking place locally and throughout the world.

SUMMARY OF THE EMBODIMENT

The present invention advantageously addresses the needs above as well as other needs through the provision of the methods, apparatuses, and systems that enhance entertainment associated with broadcast content. Further, some implementations provide methods and systems to access additional, enhanced and/or interactive content associated with a broadcast program received over a closed broadcast network. Some embodiments provide methods of enhancing broadcast content by receiving broadcast content from a broadcast content source over a closed network, receiving a request to tune in a broadcast program, tuning in the broadcast program from the broadcast content, extracting a program identification of the broadcast program from the broadcast content, and communicating the program identification to a remote network access device to allow access over a network to additional content associated with the broadcast program.

Some further embodiments provide methods of enhancing broadcast content. These methods can receive a first program identification from a broadcast content receiving device, where the first program identification is extracted from broadcast content and identifies a first broadcast program accessed from the broadcast content received from a content provider over a closed network; access a network; direct the access over the network to a predefined information source on the network; supply the first program identification to the predefined information source; receive a first identification of a first information source on the network; access over the network the first information source based on the first identification of the first information source; and receive and providing access to the additional content related to the first broadcast program accessed.

Other embodiments provide systems that provide access to additional content associated with broadcast content. Some of these systems include a broadcast content receiving device coupled with a broadcast content source over a closed network to receive broadcast programs, where the broadcast content receiving device comprises: a tuner to tune in one or more broadcast programs; an extractor that extracts a broadcast program identification of at least one of the one or more broadcast programs; and a transmitter that transmits the broadcast program identification to a remote and separate network access device. Some embodiments additional can further include a remote network access device distant and separate from the broadcast content receiving device, where the remote network access device is communicationally coupled with the broadcast content receiving device, and the remote network access device comprises: a receiver that is communicationally coupled with the transmitter of the broadcast content receiving device to receive the broadcast content identification; a memory storing a network access to a predefined information source; and a network interface coupled with a distributed network such that the network interface utilizes the network access to the predefined information source to communicate the broadcast program identification over the network to the predefined information source, to receive a first identification of a first information source on the network, and to access over the network the first information source utilizing the first identification of the first information source.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
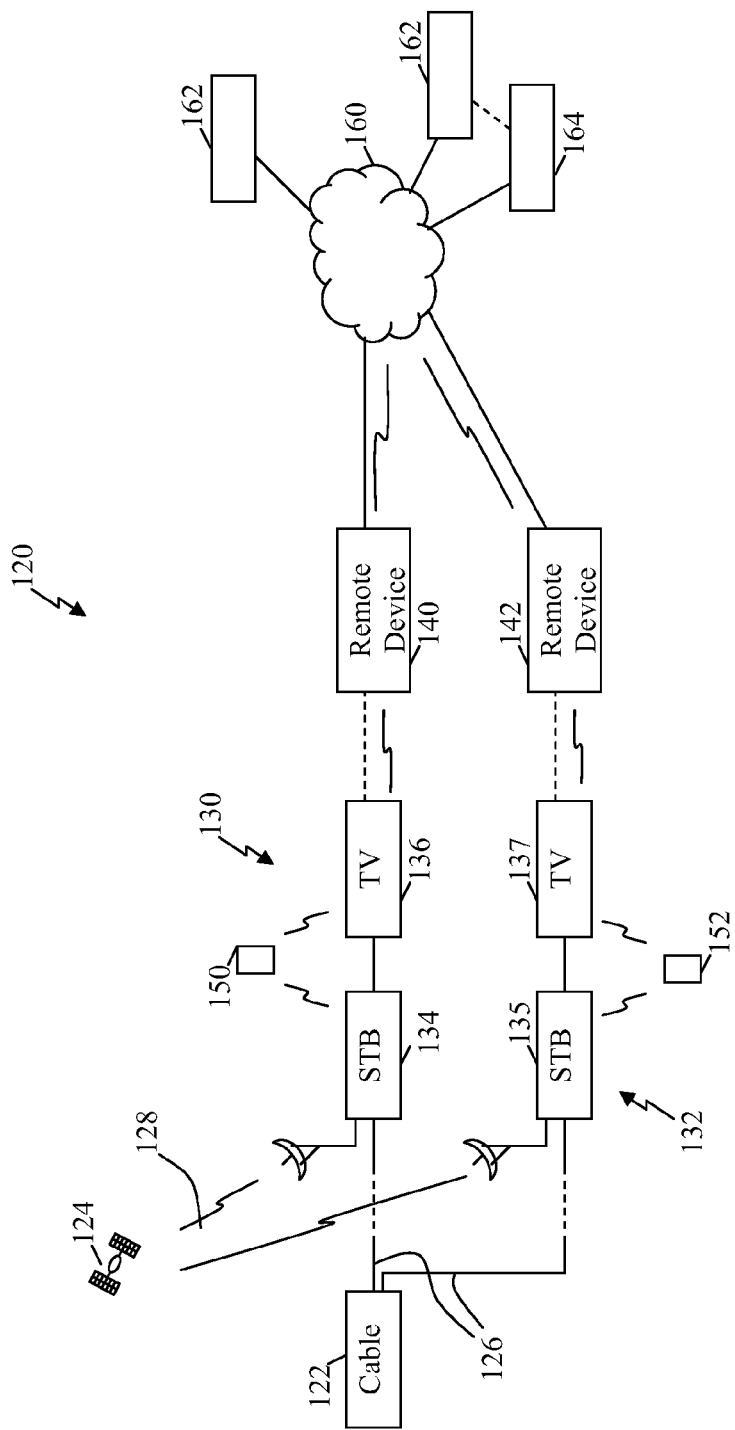
FIG. 1 depicts a simplified block diagram of a broadcast system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide enhancements to broadcast content. Further, additional content and/or interactions associated with broadcast content can be accessed. This additional content can, in some implementations, be accessed through a secondary or remote device from the device receiving and/or playing back the broadcast content. In some embodiments, the device displaying and/or playing back the content can transmit information and/or an identification of the content being received to a remote or separate device. The remote device can utilize the information and access one or more distributed networks to acquire additional information and/or allow a user to participate in an interactive experience that is associated with the broadcast content.

FIG. 1 depicts a simplified block diagram of a broadcast system 120 according to some embodiments. The system includes one or more broadcast content sources 122, 124, one or more broadcast content receiving devices 130, 132, and one or more remote network access devices 140, 142 (referred to below as remote devices). The broadcast content sources 122, 124 communicate broadcast content over closed broadcast communication networks 126, 128, respectively, to the one or more broadcast content receiving devices 130, 132. These broadcast content sources 122, 124 can be substantially any broadcast content source such as a cable provider, a broadcaster (e.g., American Broadcast Company (ABC), Columbia Broadcasting System (CBS) and/or other such broadcasters), satellite transmission, terrestrial transmission, cellular source, unicast transmitting source, and/or substantially any other relevant broadcast content source. The closed broadcast networks 126, 128 provide communication at least in one direction (e.g., from the source to a receiving device) and in some instances provides for bidirectional communication within the closed network. Typically, however, the closed network does not provide communication from the receiving devices 130, 132 beyond the broadcast content source 122, 124 or outside the network, while open networks such as the Internet provide access to multiple different and varied sources and/or to other networks. The closed network can include cable infrastructure, satellite, fiber, Digital Video Broadcasting—Handheld (DVB-H) and/or other closed networks.

The broadcast content receiving device 130, 132 can include, for example, a set-top-box (STB) 134, 135, cable box, tuner, or other relevant receiver and a playback device 136, 137, such as a device that can receive textual data, device that receives video data, device that receives audio data, device that received audio and video, a television (TV), radio, or other relevant playback device. In some implementations, the receiver 134 and playback device 136 (e.g., a STB 134 and TV 136) can be incorporated into a single device. The below description is described referring to a STB and a TV to simplify the description, however, those skilled in the art will appreciate that this is representative only and that the subject invention is not limited to this combination. A STB 134 couples with one or more of the closed broadcast networks 126, 128 to receive broadcast program content. The coupling can be through wired or wireless communication. In some instances, the STB decodes and/or demodulates the broadcast signal (e.g., received MPEG format, QAM modulated, IP packets or other encoding and/or modulation) and forwards it to the TV 136 or other playback device to be rendered. In some instances, a remote control device 150, 152 can communicate with one or both of the STB and a TV, typically through wireless communication (such as through IR, Bluetooth or other relevant wireless communication).

In receiving the broadcast content the television 136 is capable of further communicating to the remote device 140 identification information of one or more broadcast programs and/or other program information about the broadcast program being accessed. The remote device can utilize this program identification information to access a distributed network 160 to obtain from one or more content sources 162 and/or databases 164 additional information and/or content associated with a broadcast program being accessed through the TV 136. This additional information can include information such as details relating to one or more actors, producer(s), director(s), other related movies, soundtrack information, artists performing music related to a movie, and other information.

Further, some embodiments provide access to participate in an interactive experience associated with the broadcast program, such as a chat room, instant messaging, Internet conferencing, Internet talk (e.g., through Skype™), video conference or other such interactive experience. The program information determined by the receiving device is broadcast locally to the receiving device. The communication between the TV (or STB) and the remote device can be wired or wireless. Typically, the communication of the program identification to the remote device can be broadcasted, communicated through a direct connection, communicated over a local area network (LAN), personal area network (PAN) using wired or wireless communication such as Bluetooth, UWB, 802.11x, or other relevant communication protocols.

The connection to the distributed network 160 can be established through substantially any relevant wired and/or wireless connection. The distributed network 160 can be substantially any distributed network such as a local area network (LAN), Ethernet, larger networks, e.g., a wide area network (WAN), the Internet, an intranet, regional, national or internal network, and/or other relevant private and/or public distributed networks. The network 160 further can be an open network that allows access throughout the network to multiple content sources and/or to access other networks. The remote device 140 can be substantially any relevant device capable of accessing content over a distributed network 160. For example, the remote device can be, but is not limited to, a computer, a laptop (e.g., with a wireless communication card), a personal digital assistant (PDA), a Mylo™ (from Sony®), a Sony PlayStation® or other gaming console, Sony PlayStation Portable™ (PSP™), a cell phone and/or other relevant devices.

Figure 2:
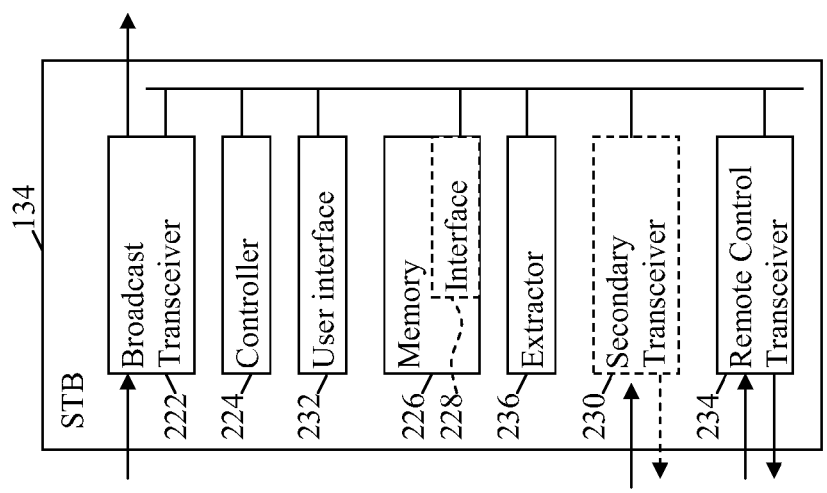
FIG. 2 depicts a simplified block diagram of a STB that can be incorporated into the system of FIG. 1.

FIG. 2 depicts a simplified block diagram of a STB 134 according to some embodiments. The STB includes one or more broadcast content receivers and/or transmitters 222, controller 224 and memory 226. A user interface 232 is typically also included in the STB that includes one or more buttons, inputs, outputs, a display (e.g., LED, LCD, and the like), indicators and/or other interface components. A wireless receiver and/or transmitter 234 to communicate with a remote control 150 can optionally be included in the STB. In some instances, the STB can further optionally include a broadcast content identification extractor 236 that can identify content identification information that can be forwarded to the remote device to identify and/or retrieve additional content as introduced above and fully described below.

The controller 224 can be implemented through a microcontroller, microprocessor, processor or other relevant processing device or combination of devices. The memory 226 can be substantially any relevant memory including, but not limited to, RAM, ROM, EEPROM, flash memory or other relevant memory technology, CD-ROM, digital video disk (DVD) or other optical disk storage and/or substantially any other relevant memory or combinations of memory that can be used to store relevant data, information, executables, programs, tables, program listings, channel lists, broadcast programs, commands and/or other relevant information. The memory is accessible by the controller 224 and/or other components of the STB. In some implementations a memory interface 228 is also included to provide communication interface between the memory 226 and the other components of the STB.

The broadcast transceiver 222 couples with the broadcast network(s) 126, 128 to receive broadcast programming content, data and/or information. Typically, the broadcast transceiver includes a decoder and/or tuner to decode the broadcast signal and tune in a desired broadcast program (typically as defined by a user through the remote control 150 and/or the user interface 232). In some embodiments, the broadcast transceiver includes a detector that can couple with one or more amplifiers, filters, detector, integrator, comparator, decoders and the like (not shown). The tuned in broadcast program can then be forwarded by the broadcast transceiver 222 to the TV 140. As indicated above the STB 134 can include one or more receivers and/or tuners allowing the STB to potentially tune or receive multiple signals and/or broadcast programs. The STB may also include conditional access mechanisms for decryption of program content, and Digital Rights Management decryption/encryption for copy-control permissions for content.

The broadcast content received at the STB 134 is typically encoded, for example, encoded according to the Moving Pictures Experts Group (MPEG) standard or other relevant encoding. In some embodiments, the STB 134 can additionally transmit requests, information, data and the like through the broadcast transceiver 222 to allow bidirectional communication with the broadcasts content source (e.g., cable provider 122, satellite content provider 124, Digital Video Broadcasting—Handheld (DVB-H) or the like) over the closed network 126, 128. For example, the bidirectional communication can allow status communications, VOD (video on demand) communications and/or other services.

The optional additional remote control receiver and/or transceiver 234 can be included to allow the STB 134 to at least receive communications from a remote control 150. Typically, the remote control includes commands and/or communications associated buttons on the remote control. In some instances a single button may have multiple different commands or communications associated with it depending on a state of the STB, TV and/or the remote control. Upon receipt of the commands or communications, the remote control receiver 234 forwards the communications to the controller 224 for processing. The receiver 234 can include, in some embodiments, a detector (e.g., RF or optical detector or the like), that can couple with one or more amplifiers, filters, integrator, comparator, decoder and the like (not shown).

The optional extractor 236 can couple with the controller 224 and/or broadcast transceiver 222 to receive at least a portion of the broadcast programming content, data and/or information to identify and/or extract broadcast program information about one or more programs being received and/or capable of being received. In some instances, the extractor identifies a current channel, a time, a run time, a date and/or other information and generates a program identification base on this information (e.g., a concatenation of this information) for example from PSIP (Program and System Information Protocol) data in the signal. In other instances the extractor can extract a program title and/or other relevant information to generate a program identification. The broadcast program content, in some embodiments, can be evaluated to identify metadata, packets containing program information and/or identification for a program stream (e.g., from information in the vertical blanking interval for analog broadcasts, from an index into a larger database of a all programs deliverable by the particular services provider, a universally known unique identifier for a broadcast program being accessed, and/or other such information). Additionally or alternatively, the extractor can access a programming guide or other listing that is supplied with or in addition to the broadcast programming content to retrieve program identifications. For example, in some embodiments, the extractor filters programming content for metadata and/or other predefined information searching for known parameters (e.g., a title parameter, a unique identifier or the like).

Figure 3:
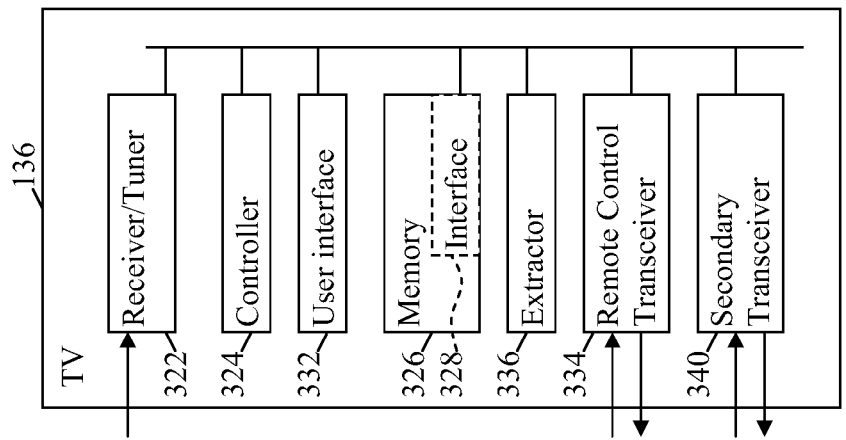
FIG. 3 depicts a simplified block diagram of a TV that can be incorporated into the system of FIG. 1.

FIG. 3 depicts a simplified block diagram of a TV 136 according to some embodiments. The TV can display television signals in one or more of a variety of different formats, including but not limited to, standard analog or digital television formats, high-definition television formats (HDTV) and/or other relevant formats. The TV includes one or more broadcast content receivers 322, a controller 324, memory 326, a user interface 332, and a remote control wireless receiver and/or transmitter 334. The TV can optionally further include a broadcast program identification extractor 336 that can identify program identification information from the broadcast content, and a secondary transmitter, receiver and/or transceiver 340 that communicates with a remote device. The extractor 336 can detect, retrieve and/or extract an identification of one or more broadcast programs received through the receiver 322 from the STB 134 that can be forwarded through the secondary transceiver 340 to the remote device to identify and/or retrieve additional content as introduced above and fully described below.

The controller 324 can be implemented through a microcontroller, microprocessor, processor or other relevant processing device or combination of devices. The controller couples with the memory 326, broadcast transceiver 322, remote control receiver/transceiver 334, secondary transceiver 340, extractor 336 and the user interface 332 to receive data, instructions and/or communications from these components and further provide at least some control over the operation of the components of the TV. The memory 326 can be substantially any relevant memory including, but not limited to, RAM, ROM, EEPROM, flash memory or other relevant memory technology, CD-ROM, digital video disk (DVD) or other optical disk storage and/or substantially any other relevant memory or combinations of memory that can be used to store relevant data, information, executables, programs, tables, program listings, channel lists, broadcast programs, commands and/or other relevant information. The memory is accessible by the controller 324 and/or other components of the TV 136. In some implementations a memory interface 328 is also included to provide communication interface between the memory 326 and the other components of the TV. The user interface 332 can include a display or screen, audio output (e.g., speakers), buttons and/or other controls.

The broadcast transceiver 322 is coupled with the STB 134 to receive broadcast programming content, data and/or information that is received and typically at least partially decoded. The broadcast transceiver, in some implementations, can include a decoder and/or tuner to decode the broadcast signal(s) and tune in a desired broadcast program. In some embodiments, the broadcast transceiver includes a detector that can couple with one or more amplifiers, filters, detector, integrator, comparator, decoders and the like (not shown). In some embodiments, the TV can include more than one broadcast transceiver and/or receive to allow the reception of more than one broadcast signal and/or program. Examples of interface specifications between the TV and STB include IEEE 1394, HDMI, component, coax RF and/or other such interface specifications.

The remote control receiver and/or transceiver 334 receives communications from the remote control 150 (e.g., channel selection, volume and/or other such commands). Received remote control communications are forwarded to the controller 324 for processing. The receiver 234 can include, in some embodiments, a detector (e.g., RF or optical detector or the like), that can couple with one or more amplifiers, filters, integrator, comparator, decoder and the like (not shown).

The extractor 336 couples with the controller 324 and/or broadcast transceiver 322 to receive at least a portion of the broadcast programming content, data and/or information to identify and/or extract broadcast program information about one or more programs being received and/or capable of being received. In some instances, the extractor identifies a current channel, a time, a run time, a date and/or other information, and generates a program identification base on this information (e.g., a concatenation of this information). In other instances the extractor can extract a program title and/or other relevant information to generate a program identification. Additionally or alternatively, the extractor can access a programming guide or other listing that may be supplied with or in addition to the broadcast programming content to retrieve programming identification information from the programming guide. For example, in some embodiments, the extractor filters programming content for metadata and/or other predefined information searching for known parameters (e.g., a title parameter, a unique identifier or the like). As indicated above, in some embodiments, the STB 134 can include an extractor 236 that extracts broadcast program identifications from broadcast content, which can be forwarded to the TV (over appropriate and existing mechanisms of IEEE 1394, HDMI (I2C, data over the Vertical/Horizontal blanking interval duration), analog component (in the VBI interval), etc.) for transmission to the remote device 140 or transmitted from the STB.

The secondary transmitter and/or receiver 340 (referred to below for simplicity as a transceiver, however, those skilled in the art will appreciate that the component can be just a transmitter, separate transmitter and receiver, or a transceiver device) provides communication with the remote device 140 and can be implemented through a wired or wireless transceiver, and can communicate through wired, wireless or combination of wired and wireless communication links. For example, the secondary transceiver can be an infrared (IR), radio frequency (RF), 802.11, Wi-Fi, Bluetooth or other suitable wireless transmitter/receiver. Alternatively or additionally, the secondary transceiver 340 can communicate with the remote device through wired connections, such as direct wiring, local network connections (e.g., LAN), power line connections and/or other wired connections. The secondary transceiver 340 transmits broadcast program identifications to the remote device 140 to allow the remote device to access additional information about a program and/or to allow a user to join an interactive session over the distributed network 160 (e.g., a chat room, instant messaging, etc.). The secondary transceiver can, in some instances, further receive communications from the remote device as further described below. In some embodiments, the STB can additionally or alternatively include a secondary transceiver to communicate with the remote device. Further, as indicated above, in some embodiments, the STB 134 and the TV 136 are part of a single device providing functionality of both the TV and the STB.

Figure 4:
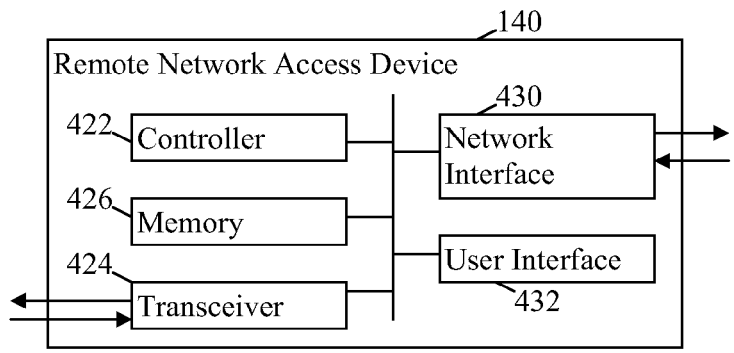
FIG. 4 depicts a simplified block diagram of a remote device that can be incorporated into the system of FIG. 1.

FIG. 4 depicts a simplified block diagram of a remote device 140 according to some embodiments. The remote device includes a controller and/or processor 422, a receiver and/or transceiver 424, memory 426, a network interface 430, and typically a user interface(s) 432. Further, the remote device can additionally include other components (not shown) to implement functions relative to the remote device, such as a cellular transceiver when the remote device can wirelessly communicate over cellular links, and/or other functionality. In some embodiments, the remote device is within a home network or is within relatively close proximity to the TV 136 and/or other device transmitting the program identification and/or information.

The controller can be a limited controller providing control over the access of additional content relative to broadcast program identifications, part of a central processor or controller of the remote device (e.g., controlling computer processes, wireless cellular communication and/or the like) and/or part of one or more controllers of the remote device. The controller 422 can be implemented through a microcontroller, microprocessor, processor or other relevant processing device or combination of devices. The controller couples with the memory 426, transceiver 424, network interface, and the user interface 432. The memory 426 can be substantially any relevant memory including, but not limited to, RAM, ROM, EEPROM, flash memory or other relevant memory technology, CD-ROM, digital video disk (DVD) or other optical disk storage, magnetic cassettes, magnetic tape, magnetic disk storage or other magnetic storage devices, and/or substantially any other relevant memory or combinations of memory that can be used to store relevant data, information, executables, programs, tables, listings, commands and/or other relevant information. In some embodiments, the memory contains an executable, application or the like that interprets the received program identification or information and activates a link or access to a predefined additional content source, Internet site, and/or other content. The memory is accessible by the controller 422 and/or other components of the remote device. In some implementations a memory interface can also be included to provide communication interface between the memory and the other components.

The receiver and/or transceiver 424 communicates with the secondary transceiver 334 of the TV 136 and/or a secondary transceiver of the STB 134. Similar to the transceiver 334 of the TV, the transceiver 424 can provide wired and/or wireless communication. The transceiver 424 receives broadcast program identifications from the TV (and/or STB). In some instances, the broadcast program identification is received in response to a request or interrogation from the transceiver 424 of the remote device. Upon receipt of broadcast program identification the remote device 140 can access the distributed network 160 through the network interface 430 to access additional information about a program, to allow a user to join an interactive session over the distributed network 160 (e.g., a chat room) and/or other relevant interaction.

The network interface 430 couples with the distributed network 160 to provide wired and/or wireless communication between the remote device 140 and the content sources 162 and/or databases 164 over the distributed network. In some embodiments, the network interface includes a modem or other relevant network interface. The user interface 432 allows a user to interact with the remote device 140 and to view and/or hear additional content retrieved from over the distributed network that is relevant to the broadcast program identified. Further, the user interface can include one or more integrated, wired and/or wireless input devices, such as but not limited to, a keyboard, a pointing device (e.g., mouse, stylist, and the like), buttons, a microphone, an IR remote control, a joystick, a game pad, a display (e.g., LCD, plasma, or other relevant display), a touch screen, speakers or other audio outputs, and/or other relevant user interfaces, that allow the remote device to receive and provide data, instructions and/or communications to and from the user.

In operation, some embodiments identify a broadcast program of interest (e.g., a broadcast program selected by a user through the remote control 150). An identification of the broadcast program is extracted, generated and/or created. In some instances, the program identification is extracted from broadcast content received, such as extracted from the broadcast program content, extracted from a listing or program guide and/or other such sources. In other instances, the program identification is based on a channel selected and a time that the channel is selected.

Once the program identification is retrieved or generated the TV 136 broadcasts the program identification to the remote device 140. As introduced above, in some implementations, the program identification is communicated to the remote device in response to a request or interrogation by the remote device to the TV (or STB). The remote device 140 utilizes the program identification to access a predefined network site or content source 162, such as a server or other computer on the network 160. For example, the remote device 140 stores one or more Internet site addresses in the memory 426. In those instances where more than one site is available, the listing may be associated with criteria and/or conditions regarding when to access each site. For example, there may be a site associated with a broadcaster (e.g., National Broadcast Company (NBC)) such that the remote device accesses this NBC associated site when a program identification is received that is associated with a broadcast program distributed on NBC; a site associated with a manufacturer of the remote device may be accessed as a general predefined site that provides links to other sites based on an evaluation of the program identification; and/or other such sites may be provided based on other criteria or conditions.

The predefined network site can provide the additional content and/or interactive experience to the user. Additionally or alternatively in some embodiments, once the predefined network site is accessed, the program identification is forwarded to the site. The server 162 and/or database 164 utilizes the program identification to identify one or more other network resources, source content and/or sites available that are associated with the identified broadcast program. The site can then route the remote device's network connection to a content source and/or network site hosted by a content source to obtain additional information related to the identified broadcast program and/or to join an interactive experience related to the identified broadcast program. In some instances, where multiple resources are available, a listing is returned to the remote device 140 that can be displayed to allow a user to select a desired resource. Alternatively in some instances, the predefined site routes the network connection of the remote device to a network resource or site and subsequently provides a listing of additional sites.

Figure 5:
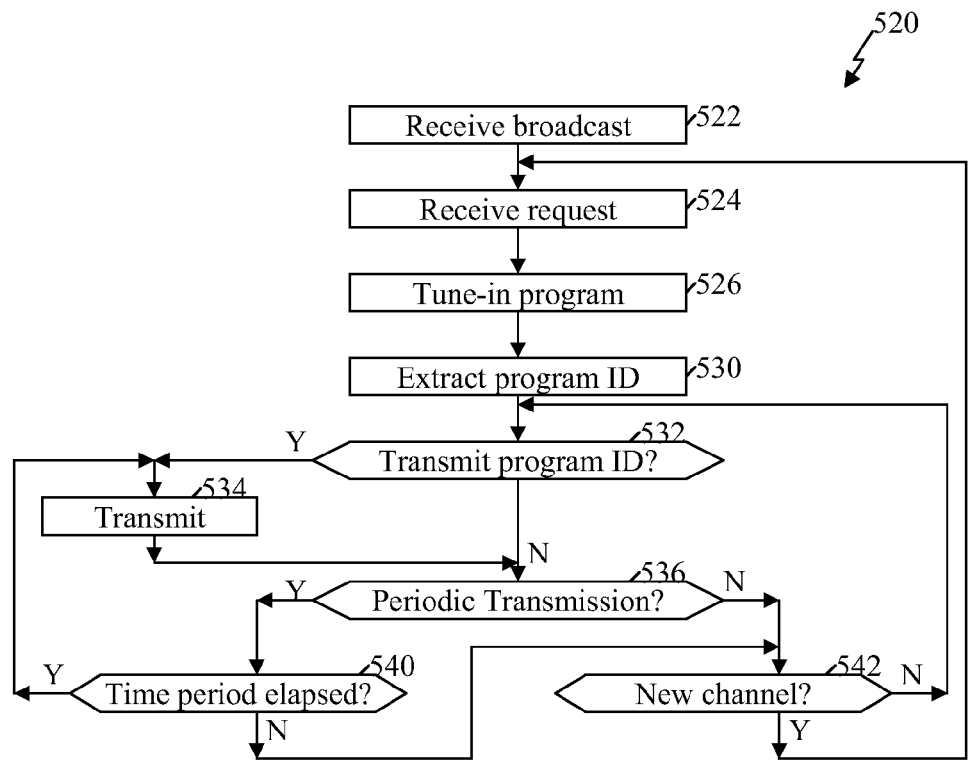
FIG. 5 depicts a simplified flow diagram of a process according to some embodiments that in part implements the acquisition of additional content associated with a broadcast program.

FIG. 5 depicts a simplified flow diagram of a process 520 according to some embodiments that in part implements the acquisition of additional content associated with a broadcast program. In step 522, broadcast content is received from the broadcast content provider (e.g., cable provider 122, satellite content provider 124, or the like) over a closed network 126, 128. In step 524, a request is received to tune or decode a selected broadcast program and/or channel. In step 526, the broadcast program is tuned in from the broadcast content and made available to the user (e.g., displayed through the TV, played back over a radio or tuner, or the like).

In step 530, the broadcast program identification is determined, extracted and/or retrieved. Again, this identification can be extracted from the broadcast content, identified through metadata, extracted from a programming guide, and/or other determinations. In some embodiments, steps 522, 524, 526 and 530 are implemented through a STB 134 and the relevant program identification is supplied to the TV or maintained within the STB when the STB optionally includes a secondary transmitter 230.

In step 532 it is determined whether a request is received for the program identification. When a request is not received the process 520 can skip to step 536. Alternatively, when a request is received, the process continues to step 534 where the program identification is communicated to the remote device. This communication can include a general broadcast of the program identification, can be transmitted as a local unicast transmission directed to the remote device, communicated with limited access (e.g., encrypting some or all of the communication, incorporating an address or identification of the remote device in the communication, and/or other such limits), and/or other such communication techniques. In some embodiments, the received request includes a device address or identifier that can be used in directing and/or unicasting the program identification to the remote device.

In step 536 it is determined whether transmission of the program identification is to be periodically communicated. In some embodiments, the transmitting device (e.g., TV 136) periodically transmits the program identification to allow devices of the local network or within wireless range of the transmission to receive the information without having to interrogate the transmitting device (e.g., when devices do not have the functionality to interrogate), when the transmitting devices is incapable of receiving a request for the program information, and/or other reasoning. The period can be substantially any period, such as once every three minutes, five minutes, 30 seconds, or other such periods. When periodic transmission of the program identification is not to be implemented the process skips to step 542. Alternatively, when the program identification is to be communicated periodically step 540 is entered where a timer is compared with a threshold time period to determine whether a predetermined relationship exists between the threshold time and the clock. For example, the clock can be compared with the threshold time to determine whether the clock is equal to or greater than the threshold. The timer or clock can be started for example at start up of the TV or other transmitting device, once a program identification is extracted in step 530 and/or at other instances. Further in some implementations, the clock or timer can be reset in step 534 following the transmission of the program identification.

When the predetermined relationship exists the process returns to step 534 to transmit the program identification. In step 542, it is determined whether a different or new program identification is to be transmitted. For example, it can be determined whether a new channel on the TV (or radio) has been selected, whether a new program identification is detected or received, a new program is started, or other such factors. When a new channel is has not been selected or other factors are not detected, the process returns to step 532 to determine whether a request for the program identification has been received. Alternatively, when a new channel is selected the process returns to step 524 to tune to the requested channel. In those instances where other factors are evaluated in step 542 one or more additional steps (not shown) can optionally be included to perform the desired function(s) and the process can return to step 530 to retrieve or extract the program identification.

It is noted that step 532 or steps 536 and 540 can be optional or eliminated from the process 520. Further in some embodiments, one or more additional steps can be included or one or both of steps 532 and 536 can be replaced with a conditional step, such as determining whether the STB or the broadcast content provider instructs the transmission of the program identification. Additionally or alternatively, the process can continue from step 230 directly to step 234 such that the program identification is broadcasted once following the tuning of the selected channel and/or other such configurations.

Figure 6:
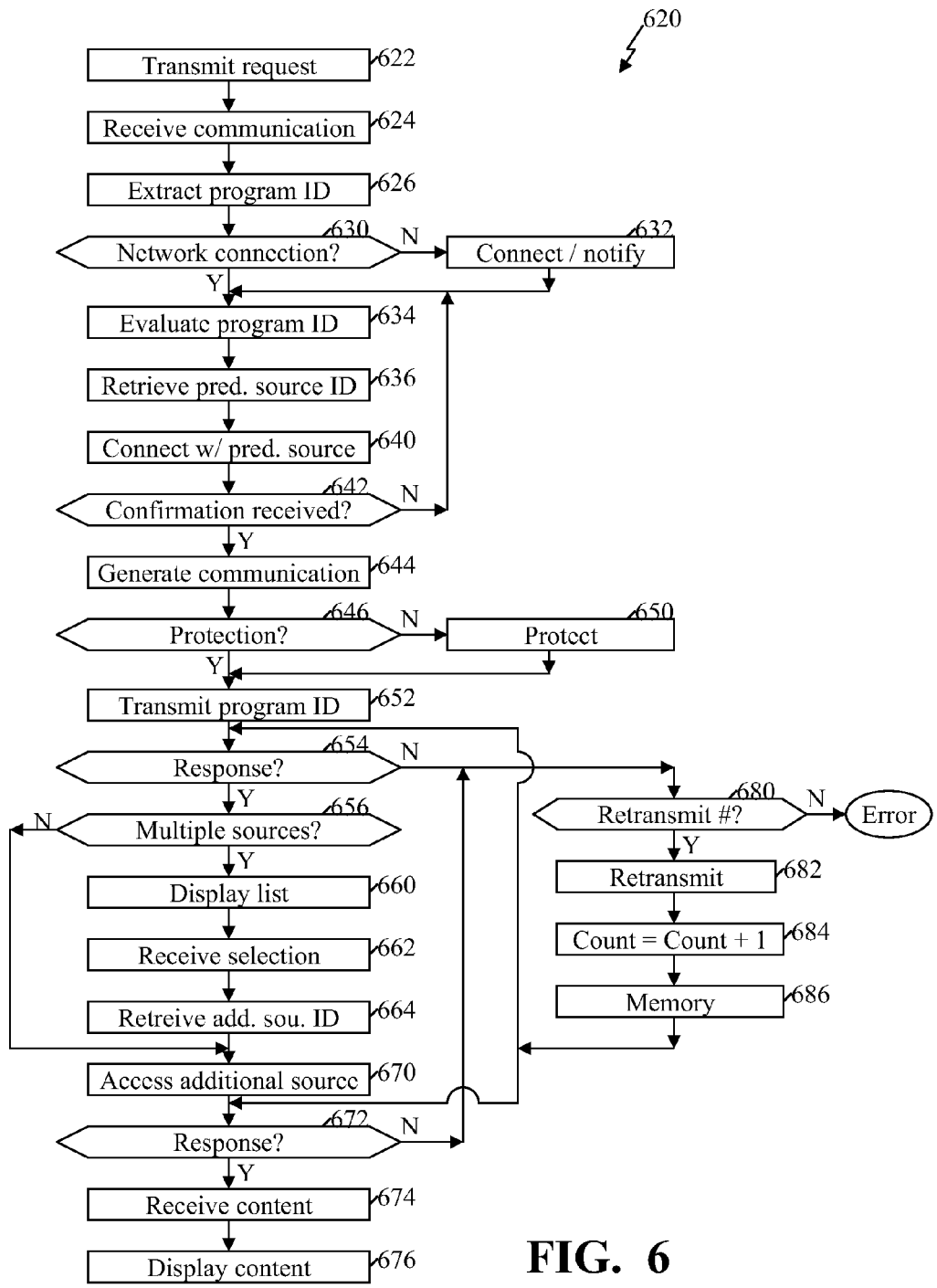
FIG. 6 shows a simplified flow diagram of a process of accessing additional and/or enhanced content according to some embodiments.

FIG. 6 shows a simplified flow diagram of a process 620 of accessing additional and/or enhanced content according to some embodiments. In step 622, a request for a program identification is transmitted from a remote device 140. The request can be a general broadcast communicated to one or more devices on the local network and/or within range of the transmission (e.g., when wirelessly transmitted), the request can be directed to a specific intended device (e.g., TV, STB, or other device), the request can be encrypted, addressed and/or other such limiting effects. The remote device, in some instances, includes a remote device identifier or address that can be used by the TV or other device when responding to the remote device when forwarding the program identification. In some embodiments, step 622 is excluded and/or is optional.

In step 624, a program identification is received from a broadcast content receiver (e.g., a radio or TV). Again, the program identification is extracted from the broadcast programming content received over a closed network (e.g., extracted from a programming guide, extracted from metadata, identified within the broadcast stream, received as a separate communication and extracted from the separate communication, and/or the like). Step 624 can optionally further include verifying that the communication is directed to the remote device (e.g., detecting an address or identifier of the remote device, accurately decrypting the communication), confirm accurate reception of the communication (e.g., evaluating error corrections), performing other processing of the communication, returning a confirmation to the transmitting device and/or other processing (e.g., returning an error communication when the transmission is not accurately received).

In step 626, the received communication is evaluated and the program identification is extracted and/or retrieved from the communication. As defined above, the program identification can include a tuned channel, a time, a title, a network broadcaster, an owner or distributor of the content (e.g., a movie studio, a production company, and the like), a unique identifier, a number (e.g., a predefined numbering scheme can be defined such as sequential count that is reset daily, weekly, monthly or other such period), and/or other identification.

In step 630, it is determined whether a network connection is established with the distributed network 160. In those instances where a network connect is not established, step 632 is entered where a network connection is established or an indication that a connection cannot be established is generated (e.g., an error message and/or tone is provided to the user). The process 620 continues to step 634 where the program identification is evaluated and access to a predefined information source is identified and retrieved. As described above, the predefined information source is often a single predefined source, such as a link, address, URL or the like stored on the remote device to a server 162 on the distributed network 160 that manages one or more Internet sites that the remote device can access and interact with to receive additional links to additional content sources and/or additional information.

In some embodiments, the remote device 140 can additionally or alternatively store and/or have access to a listing of multiple predefined information sources, and the program identification and/or accompanying information can be evaluated in an attempt to identify one or more predefined information sources from the multiple sources that are relevant to the program identified. For example, the program identification and/or accompanying information is evaluated in attempts to identify a broadcaster, identify a production studio (e.g., Sony Pictures, MGM, Paramount or other such production studios), identify a channel of the broadcast program, identify the broadcast content source (e.g., cable provider, satellite broadcast provider, etc.), and/or other such identifiers. Based on the evaluation of the program identification, one or more of the predefined information sources can be identified. In some embodiments, one source is selected and the process 620 continues. Alternatively or additionally, a listing of the sources can be provided allowing a user to select which of the sources to access.

Still referring to FIG. 6, the process 620 continues to step 636 where the predefined source identification (e.g., address, link, URL or other access information) is retrieved. In step 640 the remote device directs the network access to the identified predefined information source using the address or link. In step 642, it is determined whether confirmation is received from the predefined information source. This confirmation can be a reply verifying a connection with the predefined source, a request from the predefined source, receiving information from the predefined source, receiving Internet page content to be displayed on the remote device and/or other such confirmation. When a confirmation is not received an error is generated and/or the process optionally returns to step 634 to evaluate the program identification, verify the predefined source address and/or select a different predefined information source.

When a confirmation is received, step 644 is entered where the remote device generates a communication including the program identification to be transmitted over the network. In step 646 it is determined whether encryption and/or other protective measures are to be implemented in communicating with the predefined information source. When encryption or other protection is to be performed, step 650 is entered where appropriate encryption and/or other protection is applied. In step 652 the communication is transmitted forwarding the program identification. The predefined information source utilizes the program identification to determine whether additional information and/or other information sources are available that can provide information and/or interactive experiences associated with the identified broadcast program. In some embodiments, when more than one additional source is available, the predefined information source 162 may return a listing to the remote device 140.

The process 620 continues to step 654 to determine whether a response is received from the predefined information source (e.g., server 162). When a response is not received the process proceeds to step 680. Alternatively, step 656 is entered to determine whether the response identifies multiple additional sources that contain information and/or interactive experiences associated with the broadcast content and the communicated program identification. Similarly, options could be provided that ask the user whether she/he wants to access a particular site (e.g., a chat site is identified and the response can query the user whether the user wants to join the chat). In instances where only a single additional information source is identified and/or options are not presented or available, the process skips to step 670. Additionally or alternatively, the remote device may identify the broadcast program based on the program identification and/or information, and determine based on locally stored information that a predefined Internet site is established for that broadcast program, and ask the user whether the user wants to access this predefined site. Again, when the user wishes to access the predefined site the process can skip to step 670 to access the site.

When multiple additional sources are identified by the predefined information source 162, step 660 is entered where a listing is displayed and/or otherwise made available (e.g., audio output identifying the options and associating those options with selections on the user interface) to the user. In step 662 a selection is received from the user through the user interface. In some embodiments, the process may remain at step 662 awaiting a selection until a selection is made, until a time period has expired, a new program identification is received (causing a return to step 624) or other conditions or events occur. In step 664, the remote device retrieves and/or selects an identification (e.g., an address, link, URL, and/or other defined access) to an additional information and/or content source associated with the received selection. This retrieval can include extracting access information supplied by the predefined source when the additional content source(s) was identified, can include a communication of the selection back to the predefined site to receive the additional information source identification in response to the communication and/or other such actions.

In step 670 the remote device is directed to access and/or accesses the additional information source. For example, an Internet browser of the remote device is directed to a designated Internet site address of the open and distributed network 160. In step 672, the process determines whether a response is received from the additional information source. When no response is received the process continues to step 680. Alternatively, additional content is requested and/or received in step 674. In step 676, the additional content is displayed, played back and/or otherwise made accessible to the user through the remote device 140. The remote device 140 continues to allow the user to view and/or listen to the additional content, to interact with the additional information source to receive additional information and/or participate in an interactive experience (e.g., participate in a chat session with other remote users, participate in a video conference, Internet or other similar conferencing, and/or other such interactive experiences), or to access other sources (e.g., allowing the user to access substantially any Internet site using a browser, return to step 656 to access other related information sources, and the like).

In step 680, it is determined whether the program identification is retransmitted a predefined number of times. When the program identification has been retransmitted the predefined number of times an error is generated. Alternatively, the process continues to step 682 to retransmit the program identification to the identified additional information source. In step 684 a counter is incremented and the process 620 returns to one of steps 654 or 672.

Figure 7:
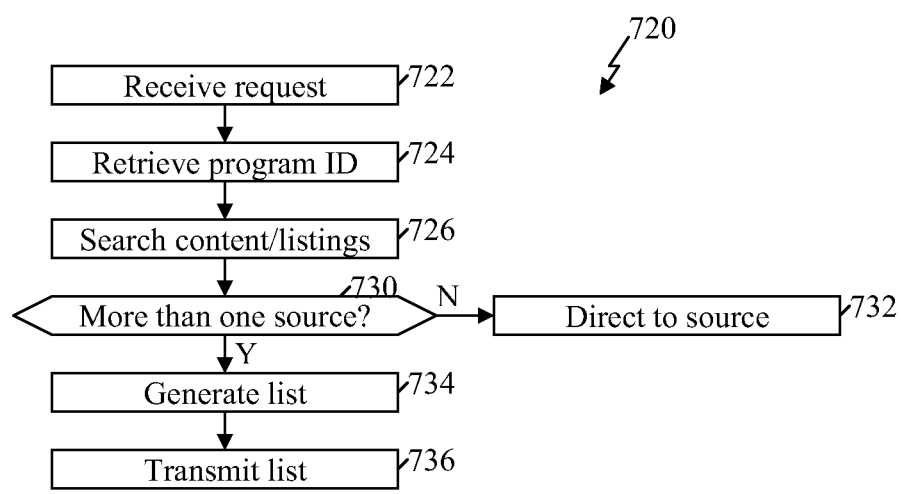
FIG. 7 depicts a simplified flow diagram of a process implemented by a predefined information source (e.g., a server) accessible by a remote device through the distributed network.

FIG. 7 depicts a simplified flow diagram of a process 720 implemented by a predefined information source (e.g., server 162) accessible by the remote device 140 through the distributed network 160. The predefined information source can be substantially any Internet site, a remote server 162 or database 164 on the distributed network 160, or other such source. In step 722, a request is received from a remote device 140. In step 724, the information source identifies and/or retrieves the program identification. Based on the program identification, the information source searches one or more local and/or remote listings, databases, tables and/or content to identify one or more additional information sources (e.g., a separate server, a separate database, the server 162, and/or other such sources) in step 726. In step 730, it is determined whether more than one additional source is identified. When a single additional source is identified, step 732 is entered where the remote device is directed to and/or linked to the additional source (e.g., routed to the additional source, a link is forwarded to the remote device to allow the remote device or user to activate the link, and/or other such linking). When multiple additional sources are identified a listing is generated in step 734. In step 736 the listing is forwarded to the remote device.

The identified additional sources can be databases, servers, computers and/or other devices on the network that can be accessed by the remote device, typically through the distributed network 160. In many instances, the additional sources operate similar to many Internet sites accessible through the Internet allow the user, through the remote device, to retrieve additional information, query for information, link to still other information, participate in an interactive session, access a listing of one or more other users that may be also accessing the additional source, and/or other such actions. For example, in some embodiments, the additional source may provide an interactive experience (e.g., Internet conferences, chat session or the like). Further, the additional source can acquire or determine user or device names of remote devices currently accessing the additional source and participating in the interactive experience. A user upon accessing the source can be provided with a list or partial listing of other users accessing the additional source (e.g., the user can have a friends listing at the source and/or supplied to the source that can be used by the source to determine whether other users on the friends list are currently accessing the additional source). This may allow a user to more quickly determine whether she/he wants to participate in the interactive session.

In some embodiments, an intermediate broadcast detection device is incorporated with and/or coupled between the STB 134 and the TV. This intermediate detection device can receive some or all of the broadcast content and extract the program identification. Once the program identification is extracted, the detection device can transmit and/or broadcast the program information to the remote device 140 to allow the remote device to access additional and/or enhanced content.

Figure 8:
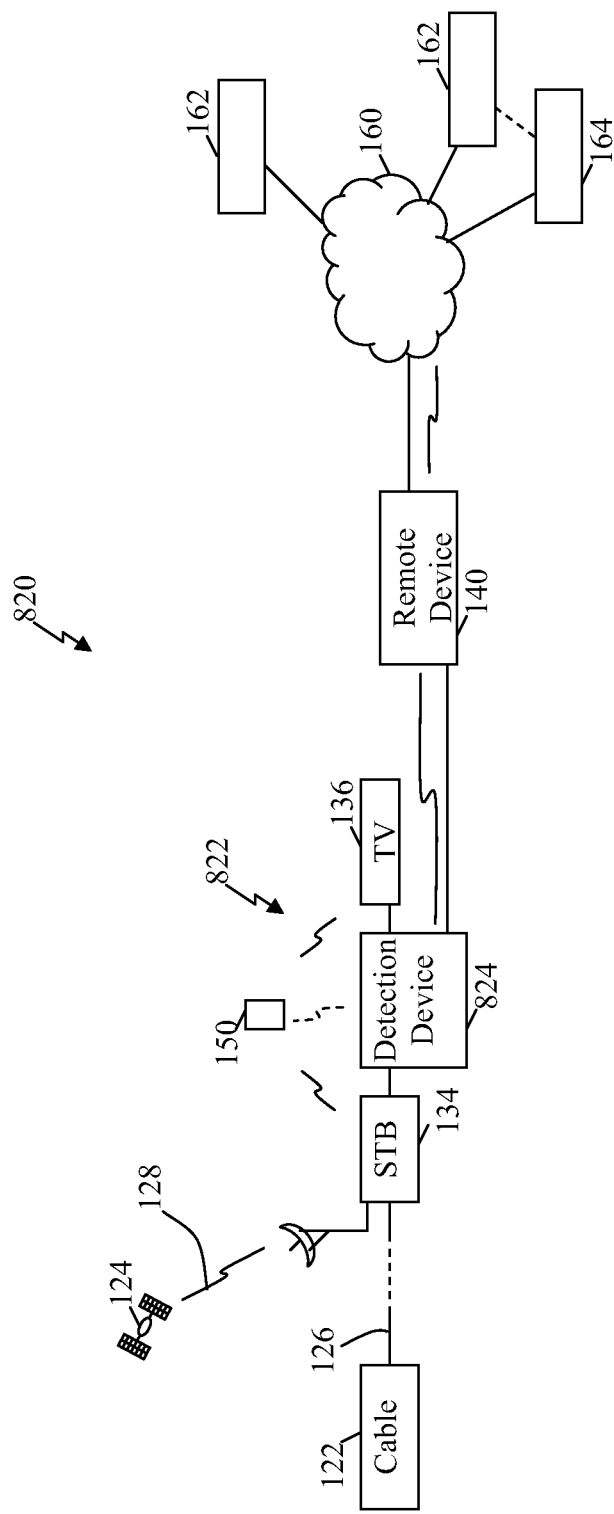
FIG. 8 depicts a simplified block diagram of a broadcast access system according to some embodiments.
Figure 9:
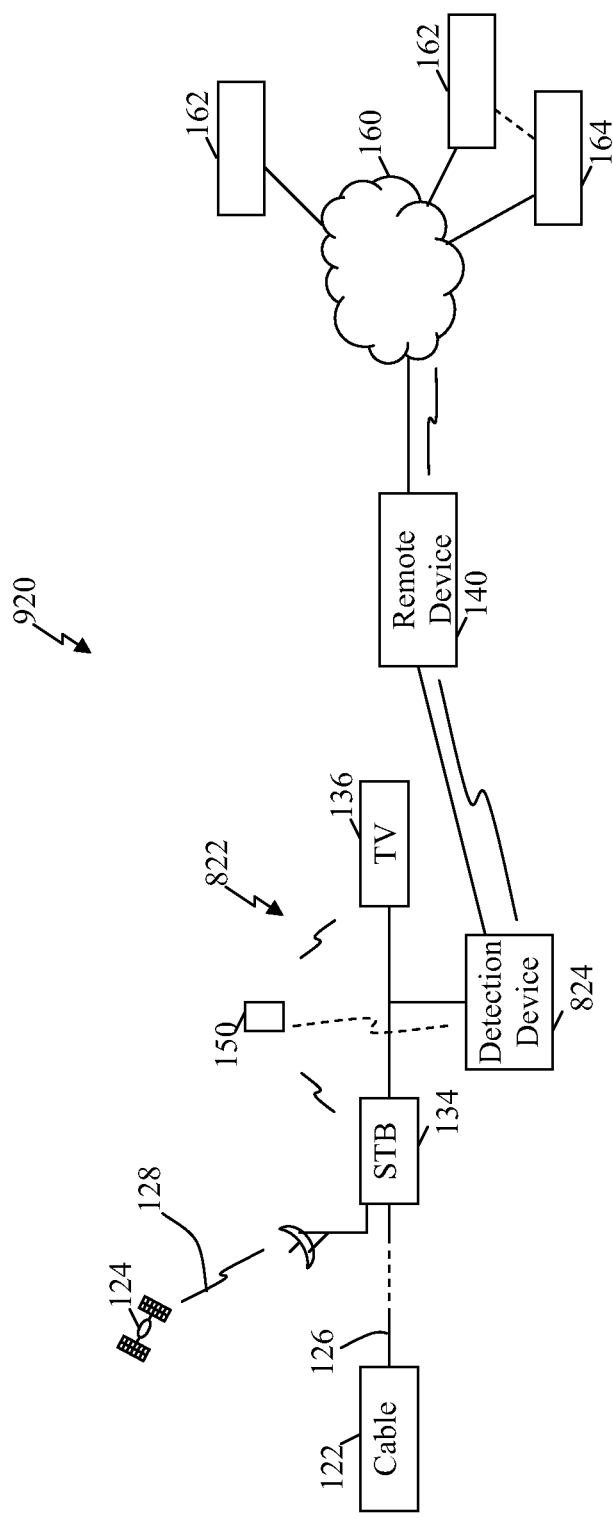
FIG. 9 depicts a simplified block diagram of an alternative broadcast access system according to some embodiments.

FIG. 8 depicts a simplified block diagram of a broadcast access system 820 according to some embodiments and FIG. 9 depicts a simplified block diagram of an alternative broadcast access system 920 according to some embodiments. Referring to FIGS. 8-9, one or more receiving devices 822 couples with one or more broadcast content sources (e.g., cable source 122, satellite source 124 and/or other sources) over one or more closed networks 126, 128. The receiving device 822 includes an STB 134 that couples with an intermediate detection device 824 that further couples with the TV or other playback device 136. In some embodiments, as shown in FIG. 8, the detection device 824 is implemented within a data path between the STB 134 and the TV 136. In other embodiments as shown in FIG. 9, the detection device 824 coupled with the path and monitors the broadcast content to the TV. The detection device 824 is further wired or wirelessly coupled with the remote network access device 140 that further couples with the distributed network 160 to access one or more additional content sources 162, 164.

Some or all of the broadcast content is received or detected by the detection device 824 that extracts and/or otherwise determines one or more program identifiers. For example, the STB can tune-in a desired broadcast program selected by a user, and forward that tuned program content to the TV 136. The detection device 824 additionally receives some or all of the tuned program content and extracts a program identification, e.g., from content transmitted over the HDMI interface. Once the program identification is obtained, the detection device 824 can broadcast, unicast and/or otherwise communicate the program identification to the remote device that can utilize the program identification to retrieve and/or access addition information. The embodiment of the receiving device 822 depicted in FIG. 8 shows the detection device 824 positioned between the STB 134 and the TV 136. In other embodiments, such as the embodiment shown in FIG. 9, the TV and the detection device can be coupled with the STB to each receive relevant content. The detection device 824, in part, allows legacy STBs and/or playback devices (e.g., TV, radio, and the like) to be utilized while still accessing additional or enhanced content and/or participating in interactive experiences associated with broadcast programs. For example, the detection device 824 can be a High-Definition Multimedia Interface (HDMI) device that couples with an HDMI link between the STB and the TV.

Figure 10:
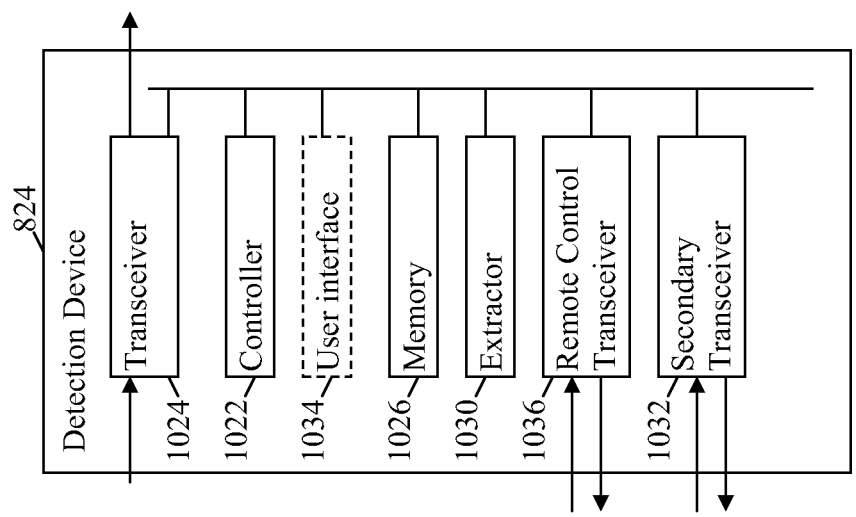
FIG. 10 depicts a simplified block diagram of a detection device that can be incorporated into the systems of FIGS. 8-9 according to some embodiments.

FIG. 10 depicts a simplified block diagram of a detection device 824 according to some embodiments. The detection device includes a controller 1022, one or more broadcast content transceivers 1024, memory 1026, an extractor 1030 and a secondary transmitter, receiver and/or transceiver 1032 that communicates with a remote device. Some embodiments additionally include a user interface 1034 and/or a remote control wireless receiver and/or transmitter 1036. The extractor 1030 can detect, retrieve and/or extract an identification of one or more broadcast programs received through the broadcast transceiver 1024 from the STB 134.

The controller 1022 can be implemented through a microcontroller, microprocessor, processor or other relevant processing device or combination of devices. The controller couples with the memory 1026, broadcast transceiver 1024, remote control receiver/transceiver 1036, secondary transceiver 1024, extractor 1030 and the user interface 1034 to receive data, instructions and/or communications from these components and to further provide at least some control over the operation of the components of the detection device 824. The memory 1026 can be substantially any relevant memory including, but not limited to, RAM, ROM, EEPROM, flash memory or other relevant memory technology, CD-ROM, digital video disk (DVD) or other optical disk storage and/or substantially any other relevant memory or combinations of memory that can be used to store relevant data, information, executables, programs, tables, program listings, channel lists, broadcast programs, commands and/or other relevant information. The memory is accessible by the controller 1022 and/or other components of the detection device. In some implementations a memory interface is also included to provide communication interface between the memory and the other components of the detection device. The user interface 1034 can include a display or screen, indicators, audio output (e.g., speakers), buttons and/or other controls.

The broadcast transceiver 1024 coupled with the STB 134 to receive broadcast programming data and/or information that is received and typically at least partially decoded. The broadcast transceiver can includes a decoder and/or tuner to decode the broadcast signal(s) and tune in a desired broadcast program. In some embodiments, the broadcast transceiver includes a detector that can couple with one or more amplifiers, filters, detector, integrator, comparator, decoders and the like (not shown). Further in some embodiments, the detection device 824 can include more than one broadcast transceiver and/or receive to allow the reception of more than one broadcast signal and/or program.

The remote control receiver and/or transceiver 1036 can receive communications from a remote control 150 (see at least FIG. 8). Received remote control communications are forwarded to the controller 1022 for processing. The receiver can include, in some embodiments, a signal detector (e.g., RF or optical detector or the like), that can couple with one or more amplifiers, filters, integrator, comparator, decoder and the like (not shown).

The extractor 1030 couples with the controller 1022 and/or broadcast transceiver 1024 to receive at least a portion of the broadcast programming data to identify and/or extract broadcast program information about one or more programs being received and/or capable of being received. In some instances, the extractor identifies a current channel, a time, a run time, a date and/or other information, and generates a program identification base on this information (e.g., a concatenation of this information). In other instances the extractor can extract a program title and/or other relevant information to generate a program identification. Additionally or alternatively, the extractor can access a programming guide or other listing that may be supplied to retrieve programming identification information. For example, in some embodiments, the extractor filters programming content for metadata and/or other predefined information searching for known parameters (e.g., a title parameter, a unique identifier or the like).

The secondary transmitter and/or receiver 1032 (referred to below for simplicity as a transceiver, however, those skilled in the art will appreciate that the component can be just a transmitter, separate transmitter and receiver, or a transceiver device) provides communication with the remote device 140 and can be implemented through a wired or wireless transceiver, and can communicate through wired, wireless or combination of wired and wireless communication links. For example, the secondary transceiver can be an infrared (IR), radio frequency (RF), 802.11, Wi-Fi, Bluetooth or other suitable wireless transmitter/receiver. Alternatively or additionally, the secondary transceiver 1032 can communicate with the remote device through wired connections, such as direct wiring, local network connections (e.g., LAN), power line connections and/or other wired connections. The secondary transceiver 1032 transmits broadcast program identifications to the remote device 140 to allow the remote device to access additional information about a program and/or to allow a user to join an interactive session over the distributed network 160 (e.g., a chat room). The secondary transceiver can, in some instances, further receive communications from the remote device as described above.

In still other embodiments, the STB 134, playback device (e.g., TV 136) and distributed network access device can be incorporated into a single device. As such, the TV 136 communicates the program identification and/or information within the single device to the network access device. The network access device can then perform functions similar to those described above as being performed by the remote device 140 in accessing a predefined content source, supplying the program identification and/or information that is then used by the predefined content source to identify additional sources.

The present embodiments provide additional and/or enhanced content to users based on programming content when the STB and/or TV are not connected with a distributed network and instead are limited to a closed network. Accessing addition content can enhance users' experiences, provide a more interactive experience and/or make the experience a more social experience. By broadcasting from the TV or STB to the remote device the program identification, the remote device is capable of accessing a predefined resource that can identify based on the program identification additional sources of content related to the broadcast program.

Additionally or alternatively, the remote device(s) coupled with and/or in the vicinity of the broadcast receiving device (e.g., TV 136) can determine the content being viewed on the broadcast receiving device by receiving and interpreting the program information and/or identification. These remote devices have access to the Internet or other shared regional or global network infrastructures, and thus may use this program identification and/or information to access resources on the network corresponding to the broadcast program being accessed or watched. For example, a laptop computer, PSP, or Sony mylo device may thus access additional content and/or an Internet chat room corresponding to the broadcast program. This chat room may have been setup or initiated by the broadcaster, the manufacturer of the Internet device, by a third party and/or other sources. The user may now instant message or chat with others who are watching the same broadcast program as the user (e.g., a live sporting event), participate in video conferencing with others watching the same broadcast content, and/or participate in other relevant interactive experiences.

While the invention herein disclosed has been described by means of specific embodiments and applications thereof, numerous modifications and variations could be made thereto by those skilled in the art without departing from the scope of the invention set forth in the claims.

What is claimed is:

1. A method of enhancing broadcast content, comprising:
    receiving from a broadcast content receiving device a broadcast program from broadcast content, via an HDMI communication interface, the broadcast content being received from a broadcast content source over a closed network;
    extracting broadcast program information about the broadcast program;
    generating only a single program identification of the broadcast program based on the broadcast program information, wherein the generated single program identification identifies the broadcast program to allow access over a network to additional content from a plurality of different sources, where the additional content is associated with the broadcast program and the generated single program identification;
    communicating the generated single program identification to a remote network access device to allow access over the network to the additional content from the plurality of different sources, wherein the communicating the generated single program identification includes not communicating any portion of the broadcast program to the remote network access device; and
    periodically recommunicating the generated single program identification.

2. The method of claim 1, further comprising:
    receiving a request from the remote network access device for the generated single program identification; and
    implementing the communicating of the generated single program identification in response to the request for the generated single program identification.

3. The method of claim 1, wherein the periodically recommunicating comprises periodically recommunicating the generated single program identification while the broadcast program is tuned in.

4. The method of claim 1, wherein the communicating of the generated single program identification comprises limiting access to the communication to the remote network access device so that only the remote network access device has access to the communication.

5. The method of claim 1, wherein the extracting of the broadcast program information about the broadcast program comprises identifying a broadcaster and a time, and generating the program identification at the television such that the broadcaster and time are incorporated into the program identification.

6. The method of claim 1, further comprising:
    identifying a predefined information source on the network;
    directing access from the remote network access device over the network to the predefined information source on the network;
    supplying the generated single program identification from the remote network access device to the predefined information source;
    receiving at the remote network access device a first identification of a first information source on the network in response to the supplying of the generated single program identification;
    accessing over the network from the remote network access device the first information source based on the first identification of the first information source; and
    receiving and providing access from the remote network access device to additional content related to the broadcast program.

7. A method of enhancing broadcast content, comprising:
    receiving, at a network access device, a first program identification periodically recommunicated from a playback device comprising a television coupled with a broadcast content receiving device that is configured to receive broadcast content from a broadcast content source over a closed network, where the television is configured to receive at least a portion of broadcast content being communicated from the broadcast content receiving device and extract the first program identification, where the first program identification is generated by the television based on first broadcast program information extracted from the broadcast content and the first program identification identifies a first broadcast program accessed from the broadcast content received from a content provider over the closed network, wherein the first broadcast program information is about the first broadcast program, wherein the receiving the first program identification includes not receiving any of the broadcast program;
accessing a network;
directing the access over the network to a predefined information source on the network;
supplying the first program identification to the predefined information source;
receiving a first identification of a first information source on the network in response to the supplying of the first program identification;
accessing over the network the first information source based on the first identification of the first information source; and
receiving and providing access to additional content from a plurality of different sources, wherein the additional content is related to the first broadcast program accessed.

8. The method of claim 7, further comprising:
transmitting a request to the television requesting the first program identification such that the receiving the first program identification is in response to the transmitted request.

9. The method of claim 8, wherein the accessing the first information source comprises accessing a chat room relating to the first broadcast program accessed.

10. The method of claim 7, further comprising:
evaluating the first program identification; and
wherein the directing the access over the network to the predefined information source comprises selecting the predefined information source from a plurality of information sources based on the evaluation of the first program identification.

11. The method of claim 10, wherein the evaluating the first program identification comprises determining whether a broadcaster can be identified, and identifying, when the broadcaster is identified, the predefined information source as being associated with the identified broadcaster such that the first information source based on the first identification of the first information source is associated with the identified broadcaster.

12. The method of claim 10, wherein the predefined information source is associated with a manufacturer of a device receiving the first program identification from the broadcast content receiver.

13. The method of claim 10, further comprising:
receiving from the predefined information source a list of one or more other users accessing the first content source.

14. The method of claim 7, wherein the first program identification comprises a tuned channel selected to access the first broadcast program through the broadcast content receiving device.

15. The method of claim 7, further comprising:
receiving, from the television, a second program identification different than the first program identification from the television, where the second program identification identifies a second broadcast program different than the first broadcast program subsequently accessed from the broadcast content received from the content provider over the closed network, where the second program identification is generated based on second broadcast program information extracted from the broadcast content, wherein the second broadcast information is about the second broadcast program;
accessing the network;
directing the access over the network to the predefined information source on the network;
supplying the second program identification to the predefined information source;
receiving a second identification of a second content source on the network in response to the supplying of the second program identification;
accessing over the network the second content source; and
receiving and providing access to additional content from a plurality of different sources, wherein the additional content is related to the second broadcast program accessed.

16. A system providing access to additional content associated with broadcast content, the system comprising:
a playback device comprising a television coupled with a broadcast content receiving device via an HDMI interface to receive broadcast programs; and
wherein the television comprises:
an extractor that extracts broadcast program information from a communication from the broadcast content receiving device, where the information extracted by the extractor comprises information about at least one of the one or more broadcast programs such that the television is configured to generate a broadcast program identification of the at least one of the one or more broadcast programs, wherein the broadcast program identification identifies the at least one of the one or more broadcast programs to allow access over a network to additional content from a plurality of different sources, where the additional content is associated with the at least one of the one or more broadcast programs and the broadcast program identification; and
a transmitter that transmits and is configured to periodically recommunicate the broadcast program identification to a remote and separate network access device, wherein the transmitter does not transmit any portion of the one or more broadcast programs to the remote and separate network access device.

17. The system of claim 16, further comprising:
a remote network access device distant and separate from the broadcast content receiving device and the television, where the remote network access device is communicationally coupled with the television, and the remote network access device comprises:
a receiver that is communicationally coupled with the transmitter of the television to receive the broadcast content identification;
a memory storing a network access to a predefined information source; and
a network interface configured to couple with a distributed network, to utilize the network access to the predefined information source to communicate the broadcast program identification over the network to the predefined information source, to receive a first identification of a first information source on the network, and to access over the network the first information source utilizing the first identification of the first information source.

18. The method of claim 7, wherein the receiving the first identification of a first information source comprises receiving a listing of a plurality of information sources; and wherein the accessing the first information source comprises accessing over the network the first information source in response to receiving a selection of the first information source from the listing.

19. The method of claim 7, further comprising:
receiving, from the first information source, a listing of other users currently accessing the first information source during the accessing the first information source.

* * * * *